United States Patent [19]

Leverett

[11] 4,262,807
[45] Apr. 21, 1981

[54] PROCESS AND APPARATUS FOR WEIGHING AND SORTING ARTICLES

[75] Inventor: William H. Leverett, Greenville, Ga.

[73] Assignee: Durand-Wayland, Inc., LaGrange, Ga.

[21] Appl. No.: 79,429

[22] Filed: Sep. 27, 1979

Related U.S. Application Data

[63] Continuation-in-part of Ser. No. 963,581, Nov. 24, 1978.

[51] Int. Cl.³ .............................................. B07C 5/16
[52] U.S. Cl. .................................................... 209/592
[58] Field of Search ............... 209/592, 593, 594, 595; 53/502; 177/1, 52, 60, 61, 119–123

[56] References Cited

U.S. PATENT DOCUMENTS

| | | | |
|---|---|---|---|
| 3,720,079 | 3/1973 | Warkentin | 53/502 |
| 3,974,888 | 8/1976 | Murakami et al. | 209/565 X |
| 4,106,628 | 8/1978 | Warkentin | 209/593 X |
| 4,177,621 | 12/1979 | Powell, Jr. | 53/502 X |

Primary Examiner—Allen N. Knowles
Attorney, Agent, or Firm—Newton, Hopkins & Ormsby

[57] ABSTRACT

A pair of spaced parallel continuous conveyor chains, provided with equally spaced transverse tow bars, move along a continuous path so as to move the bars through a loading zone, then over a weighing platform of a scale and, then, successively over discharge zones in which receptacles are disposed. Each bar pulls a loosely pivoted article carrying cup having a support pin riding on a rail to hold the cup in a horizontal position. The cup has a central cavity, within which an article is deposited when the cup is in the loading zone, from which the article is discharged when the pin is released and the cup hangs suspended from its bar. Skids carried by the weighing scale receive and totally support the cup on the weighing scale. Movable bridge struts extend between segments of the rail and are movable to drop pin to pivot the cup in one of successive dump zones. A sensor, in combination with a microcomputer, dictates when each bridge strut is opened for dropping the article in a selected dump zone.

The process includes moving the articles successively along a path averaging the weight of each article, selecting a dump zone for depositing the article in, totalizing the weight for each zone and then selecting according to optimum weight, the last article for each zone so as to provide at least a predescribed weight of articles while minimize weight overloading for each zone.

14 Claims, 17 Drawing Figures

PROCESS AND APPARATUS FOR WEIGHING AND SORTING ARTICLES

REFERENCE TO RELATED APPLICATION

This application is a continuation-in-part of my copending application Ser. No. 963,581 filed Nov. 24, 1978.

BACKGROUND OF THE INVENTION

1. Field of the Invention:

This invention relates to an article sorting machine and is more particularly concerned with a process and apparatus for weighing and sorting articles.

2. Description of the Prior Art:

In the past pivoted cups carried by conveyors have been used for receiving individual articles, such as fruits or vegetables, to be weighed and sorted. Such a cup is usually pivotally carried by its proximal end and weighed by weighing the distal or loose end of the cup, it being assumed that the cavity of each cup will orient the article with the article's center of gravity at the center of the cavity. If the article is asymetrical, however, the article may be weighed light or heavy, depending upon whether its center of gravity is toward the proximal end or the distal end of the cup. Furthermore, when such weighing devices are employed, each receptacle to be filled is fed sufficient articles to come just up to weight and then a final article of random weight is added so as to provide the weight sufficient to satisfy the labelled weight and allow for evaporation in transit and storage. No effort was made to select the last article so as to minimize weight overage.

SUMMARY OF THE INVENTION

Briefly described, the present invention, which obivates the problems described above, includes a pair of parallel conveyors which carry longitudinally spaced, parallel, transversely extending two bars in a continuous path to provide an upper flight and a lower flight. Article receiving cups are respectively pivotally carried by their proximal ends by the bars so that they hang pendant or vertical during the return lower flight and are support at their distal ends by support pins riding on a support rail assembly during much of their travel along the upper flight. Each cup to be loaded is horizontally disposed and passes through successive zones, the first being an article loading zone, the next being a weighing zone and subsequent zones being successive longitudinally spaced discharge zones in which successive solenoid controlled bridge struts. When shut, the struts permit the zones to be bypassed and, when any one thereof is opened, will release the pin of the next cup to permit the cup to pivot by gravity to drop its article into the selected discharge zone.

The selected actuation of such bridge struts is controlled by a microcomputer which selects the articles for designated discharge zones, according to prescribed and different weight ranges for each zone programed into the computer so that the articles will be sorted with articles of approximately the same weight being released in designated discharge zones. The computer totalizes the weight for each discharge zone and then scans the next series of articles to select the optimum weight article which will just top off the receptacle receiving the articles from that zone.

Each cup when disposed horizontally is vertically moveable with respect to its associated tow bar and has means on its bottom portion forwardly and rearwardly of the center of gravity so that when the cup is in the weighing zone, the upstanding skids on the pan or platform of the scale are on opposite sides of the center of gravity and receive the means for momentarily providing the sole support for that cup, whereby the entire cup and its contents are weighed, eliminating center of gravity problems for asymetrical articles.

A sensor detects the presence of the tow bar to signal that a cup is on the platform thereby providing an address for the article in the memory of the computer, at which the average of several weights is stored. The computer accesses the weight and compares it with the ranges for designating the discharge zone therefrom. It also totalizes the weight of that address with previous weights of articles assigned to that zone and compares the total with the prescribed weight and when top off is approached, selects the right article therefor.

The drop or discharge of an article from a cup is accomplished by the computer counting the distance of travel of the conveyor, based on a sensor detecting the cross bars of successive cups. Thus, counting is directly from the travel of the conveyor and error does not accumulate. When the appropriate distance has been travelled, the solenoid for that zone is energized, the bridge strut withdrawn laterally and the cup support pin released to permit the cup to pivot from its horizontal position to a vertical pendant position. The released pendant cup then is carried by its tow bar along the lower flight and a cam drum returns the cup to its horizontal position to begin the cycle again.

Accordingly, it is an object of the present invention to provide an apparatus for weighing and sorting articles, which apparatus is inexpensive to manufacture, durable in structure and efficient in operation.

Another object of the present invention is to provide an apparatus for sorting and weighing articles which will accurately and rapidly weigh in succession, each article.

Another object of the present invention is to provide a process of weighing and sorting articles into prescribed weights, in which the danger of providing additional weight, beyond that required, is reduced to a minimum.

Another object of the present invention is to provide a mechanism by which articles having a particular weight range will be sorted into prescribed zones, according to their weight and wherein the weight of articles in each zone will be totalized as the articles are distributed thereto.

Other objects, features and advantages of the present invention will become apparent from the following description when taken in conjunction with the accompanying drawing wherein like characters are referenced designate corresponding parts throughout the several views.

DESCRIPTION OF THE PREFERRED EMBODIMENTS

Figure 1:
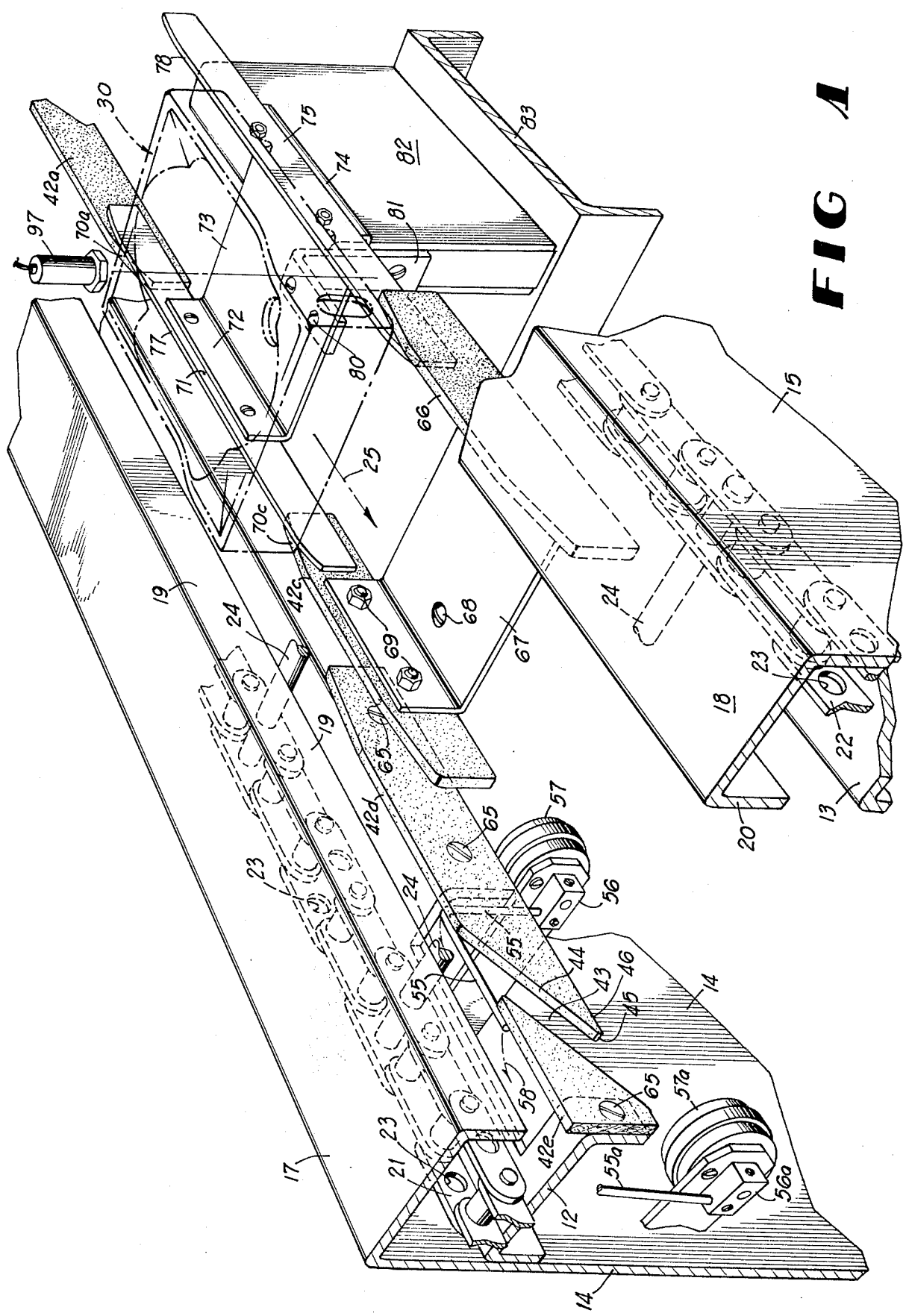
FIG. 1 is a prospective view showing a fragmented portion of a sorting machine constructed in accordance with the present invention, the fruit sizing cup being shown in broken lines.

The machine herein depicted has essentially the same structure as my above mentioned copending application, except that the solenoids of that application actuate air valves and conveyor has no pivoted cups. The mechanism for supplying successive articles to the conveyor is shown in the original application and, therefore, not repeated here, except to state that the cups 30 of the present application are respectively supplied with articles 100 in the load or loading zone A (FIG. 3) and that, thence, the cup 30 carries the article 100 across a weigh or weighing zone B to a succession of drop or discharge zones C, D, E and F. If the article 100 is not dropped in one of the zones it is discharged from the forward or discharge end of the machine and subsequently returned to the loading zone A for a second cycling.

Referring now in detail to the embodiments chosen for the purpose of illustrating the present invention, numeral 10 denotes generally a frame structure into which the mechanism of the apparatus of the present invention is incorporated. This frame structure includes cross beams and a pair of longitudinally extending upper beams 12 and 13. The beams 12 and 13 are inverted U-shaped channel members which are disposed in transversely spaced, parallel relationship in a common horizontal plane. The beams 11 and 12 respectively support side plates 14 and 15, the upper edge portions of which are bent inwardly to provide upper plates or flanges 17 and 18, the inner edges of which are provided with downwardly turned inner flanges 19 and 20.

Within the frame 10 are a pair of spaced opposed continuous conveyor chains 21 and 22, the ends of which pass over sprockets 11 at the forward and rear portions of the frame 10. The upper flights of the chains 21 and 22 ride upon tracks 29 mounted on the beams 12 and 13, respectively, so as to be disposed in a common horizontal plane throughout their length of travel in the upper flight. Alternate links of the chains 20 and 21 are provided with transversely aligned holes 23 which receive the end portions of equally spaced, parallel, transversely extending tow rods 24 which extend between the chains 21 and 22. The distance between adjacent tow bars 24 is slightly greater than the length of a cup 30.

The chains 21 and 22 are fed in synchronization with each other by a motor (not shown) in the direction of the arrow 25 in FIG. 1. The transverse tow rods 24 thus are carried in succession along a horizontal upper path and, thence, down around the forward end sprockets 11 and then below the machine back and around the rear sprockets 11 to the beginning of the upper flight of chains 21 and 22.

Each tow bar 24 carries a unitary or integral, plastic, pivotal, molded tray or cup 30. Each cup 30 has spaced opposed upstanding side walls 31, a front wall 32 joining the forward ends of the side walls and a rear wall 33 joining the rear ends of the side walls 31, thereby forming a continuous perimeter, the corners of which are rounded.

Extending inwardly from the upper edges of the walls 31, and 33 is a sheetlike article supporting panel or web 34, the central upper portion of which is concaved for receiving and retaining one article 100 which may be an orange, apple, pear, onion, potatoe, or other fruit or vegetable which with like fruits or vegetables are packaged in a bag, receptacle or container, such as container 51, and labelled a given weight. The central portion of the panel 34 is provided with a hole 36 therethrough so that no water or small trash will accumulate in the cavity 35, thereby facilitating the washing of the machine.

According to the present invention, the forward end portion of the side walls 31 are provided with vertically elongated, transversely aligned closed slots 36 and 37 through which its associated tow bar protrudes. The slots 36 and 37 each have semicircular end portions which are of a diameter slightly larger than the diameter of its associated tow bar 24. Thus, not only is the cup or tray 30 freely pivotable or rotatable about the tow bar 24, but the tray or cup 30 will also move vertically, during a period in which the tray is in a horizontal position, so that the tow bar does not provide any support for the tray or cup 30. The purpose of this is so that the tray or cup 30 may be weighed, quite independently of the fact that it is being urged forwardly by the tow bar, as will be explained hereinafter.

Retainer rings 38 on each shaft 24 prevent lateral movement to any appreciable extent of the cup 30.

Figure 2:
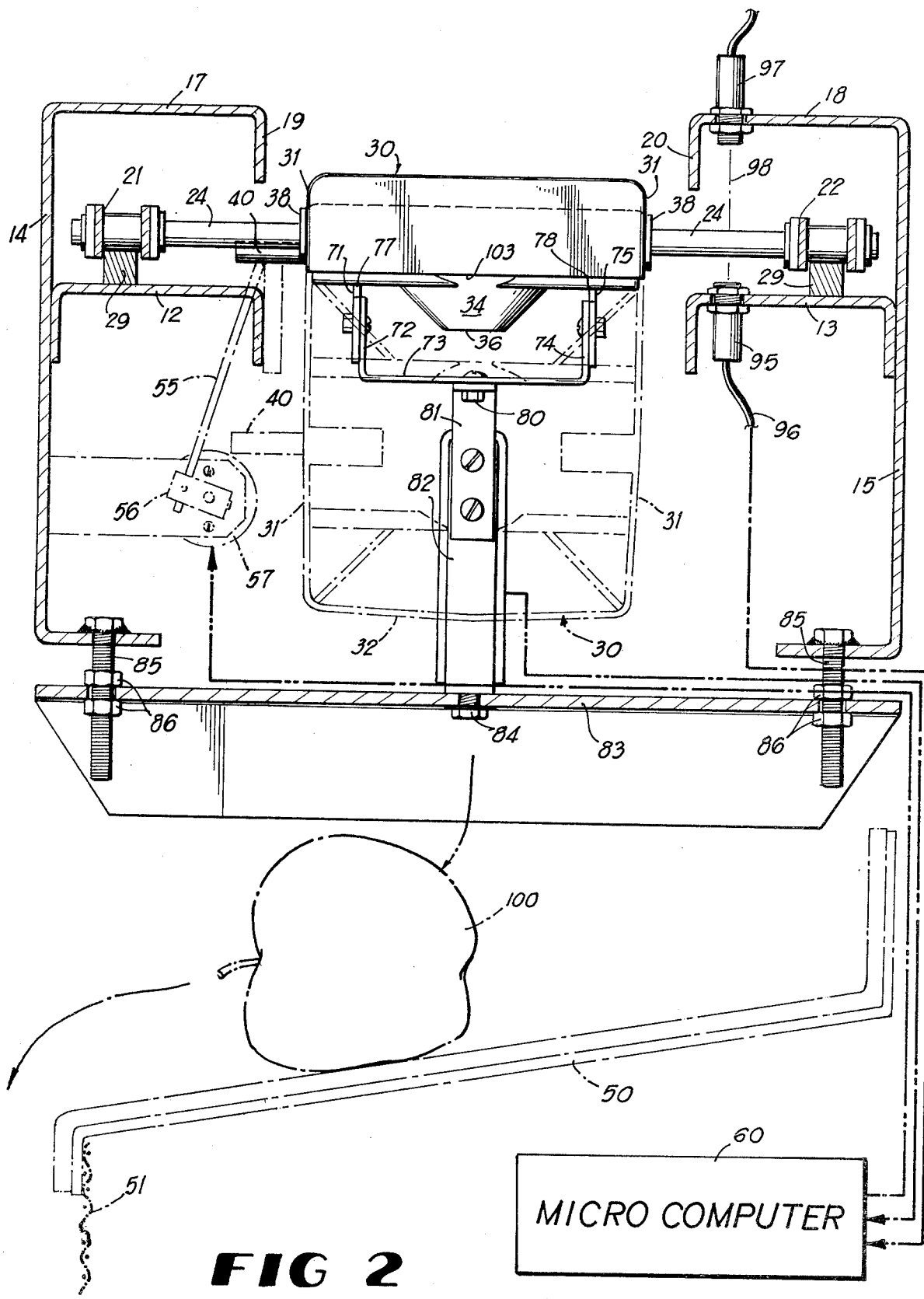
FIG. 2 is a cross sectional view taken transversely through the machine at the load cell with phantom lined take-off conveyor and a schematic electrical circuit.

As seen in FIG. 2, the chains 21 and 22 respectively ride on runners 39 mounted on the longitudinal beams 12 and 13, as seen in FIG. 2. Thus, the shaft 24 is supported at a precise position, particularly as it moves through the weighing zone B.

Spaced from the shaft 24 and disposed parallel thereto is a sidewise extending pin 40, the proximal end of which is mounted to one of the side walls 31. The function of this pin 40 is to provide a means by which the cup 30 may be supported in a horizontal position, as shown in full lines in FIG. 2, and when desired, may be dropped so as to pivot about the shaft 24 to an essentially vertical position as shown by broken lines in FIG.

2. The pin 40 thus, rides on the upper camming surface of successively disposed camming rail segments 42a, 42c, 42d, 42e, etc., as seen in FIG. 1. The ends of these rail segments 42c, and 42d overlap while the downstream end portion of rail segments 42d, 42e, etc., are provided with drop spaces 43, therebetween. Such spaces 43 are sufficiently wide that pin 40 will drop therebetween and incline on downwardly and rearwardly inclined surfaces, such as surface 44, on each of the rail segments after the rail segment 42d. This camming surface 44 is inclined downwardly and in the downstream direction so that the pin 40 may ride upon this surface until it reaches the tip 45, at which time the pin 40 will be dropped, enabling the cup 30 to pivot about the shaft 24 from its essentially horizontal position to the vertical broken line position shown in FIG. 2. The lower point 45 which is formed at the intersection of the lower edge 46 and the camming surface 44 is disposed above a sidewise inclined discharge chute or ramp 50, within each of the discharge zones identified by the letters C, D, E and F in FIG. 3.

A bag or receptacle 51, on the end of the chute or ramp 50 receives the articles, such as the apple 100 depicted in FIG. 2, when it is directed by ramp 50, sidewise.

To enable a particular 30 to bypass a particular discharge zone C, D, E or F, a removable or pivotable bridge strut such as bridge struts 55, 55a is provided over or adjacent to the top of each of the openings 43, as shown in FIG. 1. In more detail, the bridge strut 55 is a L-shaped rod, the lower end of which is generally upright and mounted in a pivot block 56 carried on the end of the shaft of a rotatable solenoid 57. When the solenoid 51 is energized, the shaft of the solenoid 51, and therefore, the block 56 is pivoted from the position shown in FIG. 1 and in broken lines in FIG. 2 laterally, as indicated by the arrows 58 in FIG. 1. When the solenoid 57 is deenergized, the solenoid 57 returns the shaft to its original position, thereby returning the block 56 to its original position.

The bridge strut 55, as explained above is an L-shaped member which is preferrably simply a rod bent to an angle of about 90°. This rod 55 is supported solely by the block 56 and extends upwardly and inwardly as depicted in broken lines in FIG. 2. The distal end of the bridge strut 55 extends longitudinally, at a position about parallel to the upper surface of the adjacent rails, such as rail 42d and 42e, so as to overlap the rear upper portion of the rail 42d and the upper forward portion of the rail 42e, as depicted in FIG. 1. The upper surface of the strut 55, thus guides the pin 40 over the opening 43, whenever the solenoid 57 is deenergized.

Figure 3:
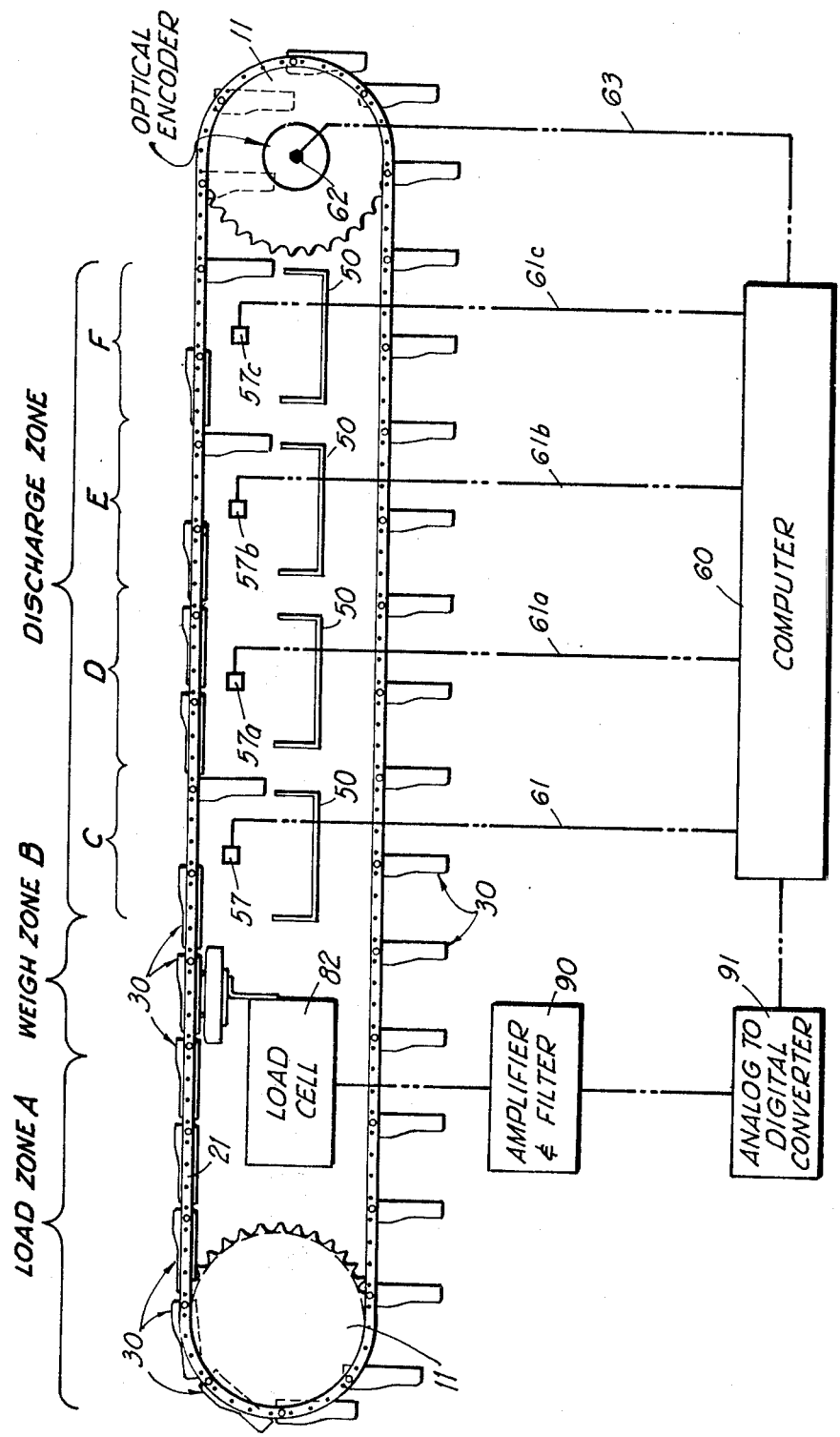
FIG. 3 is a schematic side elevational view of the machine shown in FIG. 1.

It will be understood that the strut 55 and its solenoid 57 are for the purpose of dropping a particular article such as the apple 100 into the discharge zone C. A subsequent solenoid 57a with its block 56a and strut 55a is provided for the discharge to zone D and additional solenoids 57b and 57c are likewise provided for the discharge to zones E and F, respectively, as illustrated in FIG. 3. Thus, through the actuation of any one of the solenoids 57a, 57b, 57c, the cup 30 is caused to dump its article 100 into the particular discharge zone associated with the particular solenoid 57a, 57b or 57c, as the case may be.

Each solenoid 57, 57a, 57b and 57c is connected to a microcomputer through wires 61, 61a, 61b and 61c. A pulse proportional to the speed of travel of the chains 12 and 13 is fed from an optical encoder sensor 62 by wires 63 to the computer 60 so that the computer 60 may count the distance necessary before actuating one of the solenoids 57, 57a, 57b or 57c. The selective actuation of one of the solenoids is dictated by the weight detected for the particular article 100 which is weighed in the weigh zone B.

Returning now to FIG. 1, the rails 42a, 42d are secured by screws 65 to the inner vertical flange of the longitudinal beam 12. The rail 42c and a transversely opposed complementary rail 66 are carried by the upstanding flanges of a U-shaped bracket 67 which is bolted in a fixed position to an appropriate cross-bar (not shown) of the frame 10 by means of screws, such as screw 68. The rail segments 42c is disposed inwardly of the rail segment 42d and its height can be individually adjusted by means of bolts 69. In like fashion, the rail segment 66 can be adjusted, as desired.

It will be observed in FIG. 1 that there is a spacing between the end of the rail segments 42a and 42c. These rail segments 42a and 42c are in general alignment longitudinally and having upper camming surfaces 70a and 70c which converge downwardly toward each other. Spaced inwardly of these caming surfaces is one of the weighing skids 71 which is mounted on one vertical flange 72 of a U-shaped weighing platform 53. The other vertical flange of 74 of the weighing pan or platform 73, in weigh zone B, carries a second skid 75 in opposed, parallel, complementary relationship to the skid 71. The skid 75 is spaced inwardly of the skid 66. The rear end portion of skid 71 overlaps the forward end portion of the rail segment 42a while the forward end portion of the skid 71 overlaps the rear portion of the skid 42c. Likewise, the forward portion of skid 75 overlaps the rear portion of rail segment 66. The function of these skids which have parallel horizontally disposed straight upper edges 77 and 78, respectively, is to receive each cup 30 on the edges 71 and 78 so as to support the cup 30 at an appropriate height such that its bar 24 is between the extreme ends of the slots 36, 37, whereby the front end portion of each cup 30 is generally floating but yet is towed forwardly by its rod 24. At the same time, the pin 40 is released from any support by the rail 42a or 42c and, therefore, the cup 30 is solely supported by the two upstanding skids 71 and 75 during the entire period that it is in weigh zone B.

The weighing platform or scales 73 is bolted by bolts 80 to an L-shaped bracket 81, the other end of which is bolted to a load cell 82. The load cell 82, in turn is bolted and fixed on a crossbar 83 by means of bolts, such as bolt 84. The cross-beam 83, in turn, is suspended by a pair of bolts 85, seen in FIG. 2 which protrude downwardly from the side panels 14 and 15. Nuts 86 on the bolts 85 and on opposite sides of the crossbar 83 permit incremental vertical adjustment so as to position the surfaces 77 and 78 at the appropriate height to receive the cups 30, as described above.

The load cell 82 provides analog signals which are fed through an amplifier and filter 90 to an analog digital converter 91, seen in FIG. 3. These analog signals are proportional to the weight detected by the load cell for both the cup 30 and its article 100. Such signals are converted to digital signals in the converter 91 and are fed to the computer 60. The wiring for the various electronic elements are shown in more detail in the above mentioned patent application. Suffice it to state that the computer is programed, for example, to feed all articles 100 which have a weight, up to a given first weight into the discharge zone C by actuation of the solenoid 57, after counting the distance of travel of the particular cup 30 from the weigh zone B so as to open the gate or bridge rod 55 at an appropriate time to discharge that particular cup 30. It will be remembered that such counting pulses are fed from the sensor 62 to the computer 60.

In the operation of the load cell 82, a pluarlity of weights of each cup 30 are fed to the computer 60 successively as the cup 30 is drawn over the skids 71 and 75. An enabling signal is provided by a photosensor or photoelectric cell 95, seen in FIG. 2 to direct the computer 60 to begin averaging such weights. This photosensor 95 is electrically connected to the computer by wire 96 and is, in turn, carried by the flange 13 in weigh zone B. A light source 97 is carried by the flange 18, immediately above the photosensor 95, whereby each rod 24 momentarily breaks the beam of light 98 shining from the light source 97 onto the photosensor 95. When this light 98 is broken, it is a signal to the computer 60 to begin the averaging of the weight, as described above.

Progressively greater weights for the article 100 cause the computer 60 to select and energize subsequent solenoids 57a, 57b, 57c, according to the range of weight of article 100 to be collected in a specific discharge zone C, D, E or F. Hence, substantially all articles 100 of a first given weight range are received in the discharge zone C while articles 100 of the next weight range are received in discharge zone D, etc. Any articles 100 not discharged are released from the end of the conveyor and returned by a mechanism (not shown) to be fed again to the machine at a later time.

Figure 4:
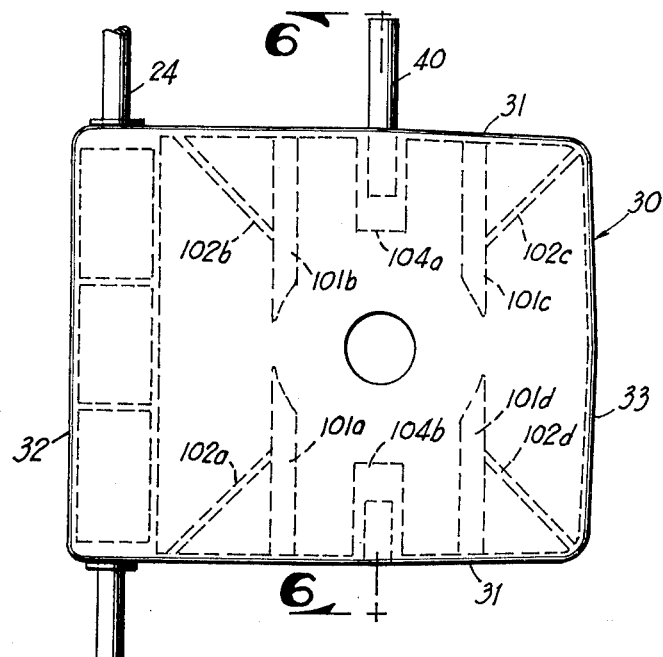
FIG. 4 is top plan view of a fruit sizing cup.
Figure 5:
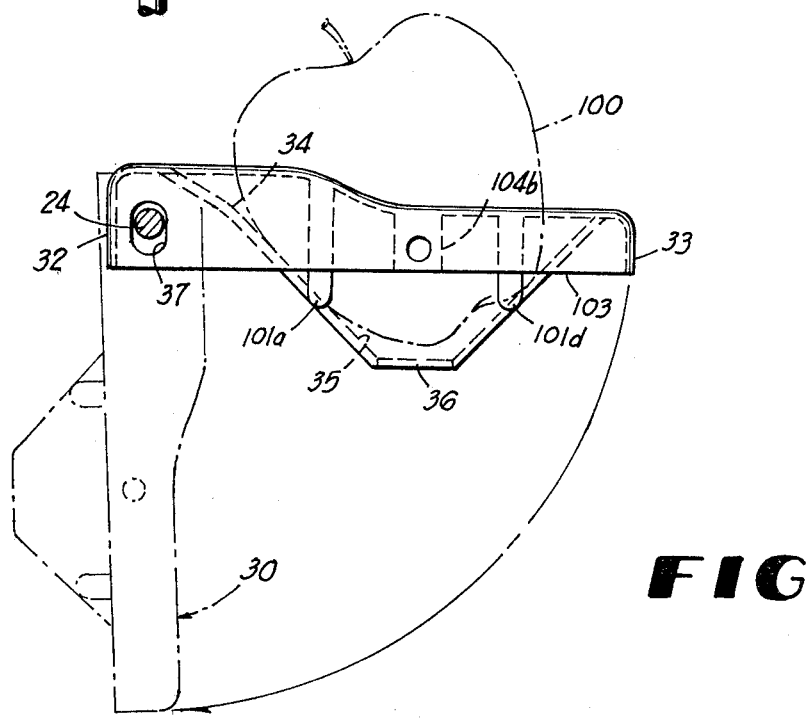
FIG. 5 is a cross sectional view taken along lines 5—5 in FIG. 3.
Figure 6:
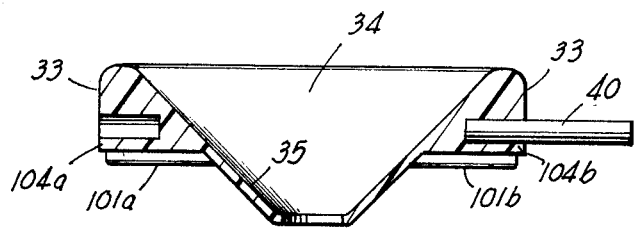
FIG. 6 is a transverse sectional view taken along lines 6—6 in FIG. 4.

In the present application I have illustrated several alternate embodiments of cup configurations which are depicted in the drawings starting with FIG. 4. In FIGS. 4 through 6 is the first embodiment which is illustrated in operative relationship with the above described machinery.

As pointed out above, the cup 30 seen best in FIGS. 4, 5 and 6, include complementary vertical side walls 31, a front wall 32 and a rear wall 33, the upper edges of which support a transverse panel or web 34 with a central article receiving cavity 35 and a central hole 36 therein. The panel 34 is reinforced by a plurality of transverse ribs 101a, 101b, 101c and 101d which extend from the inner surfaces of the side walls 31 inwardly to the conical outer surfaces of panel 24 which define the lower side of the cavity 35. The ribs 101a and 101b are in transverse alignment and the ribs 101c and 101d are also in transverse alignment being respectively spaced from and parallel to the forward ribs 101a and 101b. Diagonal ribs 102a, 102b, 102c and 102d reinforce the ribs 101a, 101b, 101c and 101d and also reinforce the panel 34 which forms cavity 35.

According to the present invention, the transverse ribs 101a, 101b, 101c and 101d protrude below the common plane of the lower edge 103 of the side walls 31, 32, and 33 of the cup 30. This is best seen in FIG. 5. The lower edges of the ribs 101a, 101b, 101c, and 101d are rounded so that they readily slide upon the edges 77 and 78 of the longitudinal skids 71 and 75, when the cup 30 is being weighed. The purpose of the panel 36 extending below the lower edge 103 is to provide a low center of gravity for the articles 100 received in the cup 30 and facilitate the orientation of the article 100 in the cup 30. The cup 30 is also provided with central reinforcing ribs 104a and 104b which are aligned with each other and protrude inwardly from the central inner surfaces of the side walls 31.

It will be observed in FIG. 5 that the front wall 31 is substantially wider i.e., higher than the rear wall 33 and that the side walls 31 slope upwardly as they approach the front wall 32, thereby providing a panel which will tend to prevent the article 100 from coming to rest between adjacent cups 30 by directing the articles 100 rearwardly into the cup or cavity 35. This also provides sufficient space at the forward end portions of the walls 31 for the vertically elongated slots 37.

In FIG. 2 it is seen that the skids 71 and 75 should be spaced apart by a distance less than the width of a cup 30 from wall 31 on one side to wall 31 on the other side. They should however, be spaced apart a distance greater than the width of the panel 34 which protrudes below the lower edge 103. By such a spacing, the central parts of the ribs 101a, 101b, 101c and 101d ride on the upper edges 77 and 78 of the skids 71 and 75.

It is now seen that substantially all of the cups 30 will have been actuated so that they pivot downwardly to their pendant position by the time such cups have reached the end of the travel of the upper flight. Some, of course, may not, for various reasons have been actuated for dropping when they pass over the various discharge zones. Such cups, nevertheless, will have discharged their articles 100 at the end of the conveyor and will then pivot downwardly to hang pendant as seen in FIG. 1. As such cups approach the forward end of the machine, they pass over an arcuate drum or peripheral surface 150 so that they are urged to a horizontal position as they pass into the load zone A and are held in such position by the camming surface of rail 42a, throughout their travel along the load zone. Thus such cups are in a position to receive their article and begin their cycle again.

Figure 7:
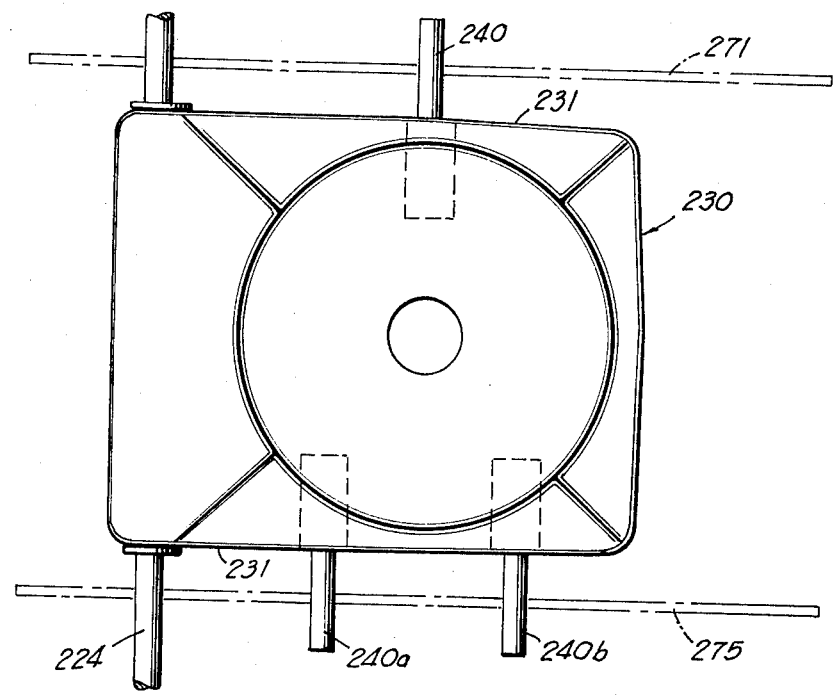
FIG. 7 is a top plan view of a second embodiment of a fruit sizing cup suitable for use in the machine shown in FIG. 1.
Figure 8:
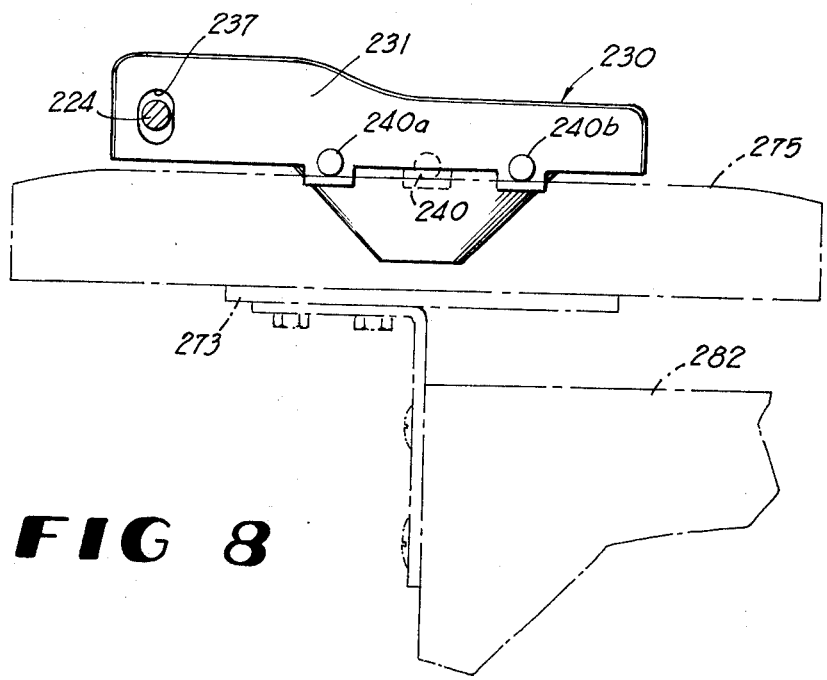
FIG. 8 is a side elevational view of the cup depicted in FIG. 7.

Referring now to FIGS. 7 and 8, a second embodiment of a cup assembly is illustrated therein, wherein cup 230 is pivotally carried on a tow bar 224 and has a pin 240 for riding upon a camming surface (not shown) to hold the cup 230, horizontally. Cup 230 and pin 240 are identical to the structure previously described for cup 30 and pin 40. The present cup 230, however, includes a pair of additional sidewise extending pins 240a and 240b which are disposed parallel to each other and protrude from the opposite side 231 from the pin 240. Pin 240 has a transverse axis at about the center of gravity of the pin 240 and its article. One pin 240a is mounted forwardly of the axis of pin 240 and the other pin 240b is mounted rearwardly of the axis of pin 240.

Pin 240 is adapted to ride up and be supported solely by a skid 271 when in weight zone B. The pins 240a and 240b are adapted to ride upon a skid 275 when the cup 230 is received in the weigh zone B so that the parallel disposed skids 271 and 275, which are supported on the weighing platform 273 of the weight cell 282 totally supports the cup 230 as illustrated in FIG. 8, the contours of the skids 271 and 275 being such that the cup 230 is lifted in its travel sufficiently that the upper portion of slots 237 no longer rest on the tow bar 224 and the tow bar 224 is intermediate the extremities of the vertically there disposed elongated slots 237 in the sidewalls 231 of the cup 230. Thus, the pin 240 serves a double function of supporting the cup 230 in its travel along the conveyor and, also, cooperates with the pins 240a and 240b to provide a 3 point suspension for cup 230 on the skids 271 and 275 so as to provide the sole support for the cup 230 in the weighing zone.

Figure 9:
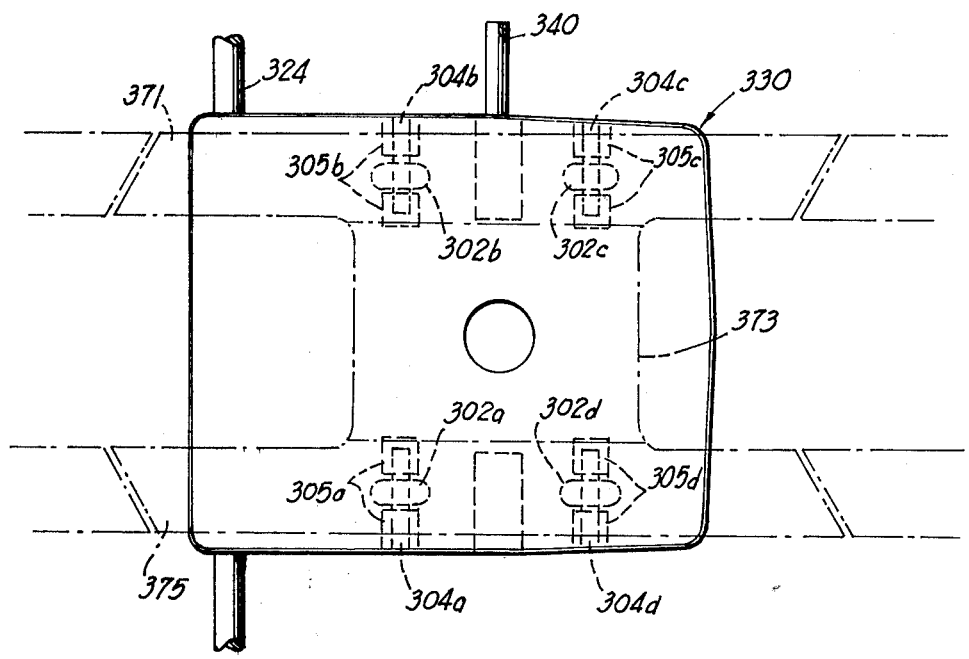
FIG. 9 is a top plan view of a third embodiment of a fruit sizing cup suitable for use in the machine of FIG. 1.
Figure 10:
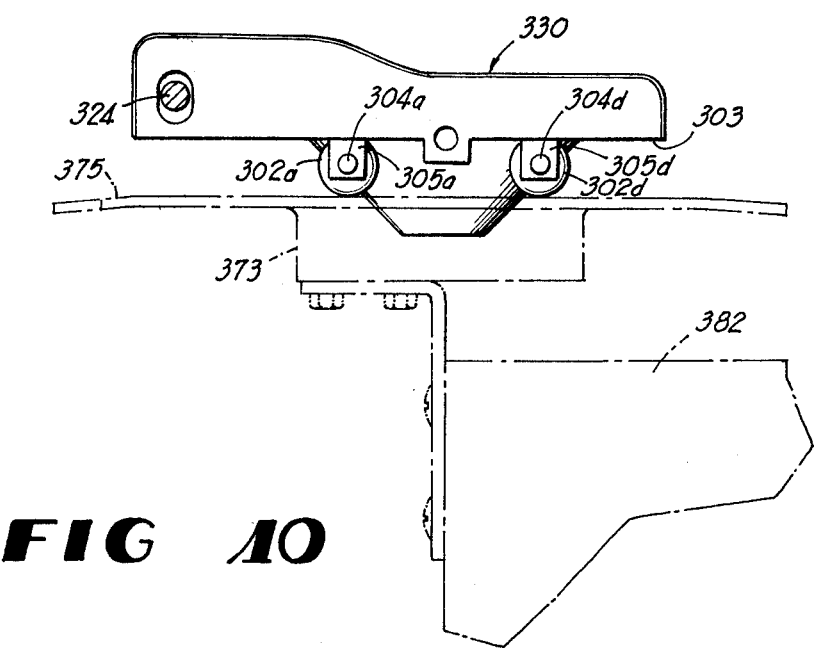
FIG. 10 is a side elevational view of the cup shown in FIG. 9.

Referring now to FIGS. 9 and 10, another or third embodiment of the cup assembly is depicted therein. This third embodiment includes a cup 330 which is provided with a pin 340 which is substantially identical to the cup 30 and the pin 40, the cup being towed by a tow bar 324 and being provided with vertically elongated slots 237 which are identical to the slots 37. According to the present embodiment, cup 330 is provided with a plurality of supporting wheels 302a, 302b, 302c and 302d which protrude below the lower edge portion 303 of the cup. These wheels 302a, 302b, 302c and 302d are respectively carried for rotation about transverse shafts 304a, 304b, 304c and 304d. These shafts 304a, 304b, 304c, 304d, in turn, are carried by pairs of downwardly protruding brackets 305a, 305b, 305c and 305d which extend from the bottom portion of the cup 330 so as to dispose the shafts 304a, 304b, 304c and 304d in positions parallel to the tow bar 324 and the pin 340, the shafts 304a and 304b being disposed in transverse alignment forwardly of the center of gravity of cap 340 and the axis of the pin 340 and the shafts 304c and 304d being disposed rearwardly thereof. Thus, the wheels 302a, 302b, 302c and 302d provide a means to support the cup 330 during the period in which the cup is in the weight zone B.

For receiving the wheels 302a, 302b, 302c and 302d there are provided a pair of opposed longitudinally parallel flat runners 271 and 275 which are spaced from each other but are tapered downwardly and inwardly so as to tend to center the cup 330 as it is pulled over the weigh zone B. These runners 371 and 375 are supported on a weighing platform 373 which in turn in connected to a weight cell 382. The weight cell functions in identically the same way as the weight cell 82 so as to weigh the contents of the cup 330 as its tow bar 324 is between the extremities of slot such as slot 337 of cup 330.

Figure 11:
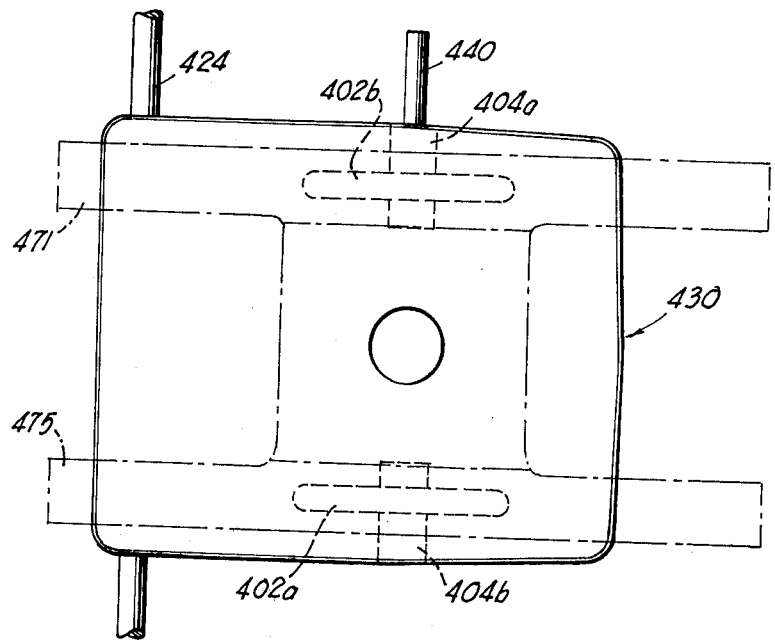
FIG. 11 is top plan view of a fourth embodiment of a fruit sizing cup suitable for use in the machine of FIG. 1.
Figure 12:
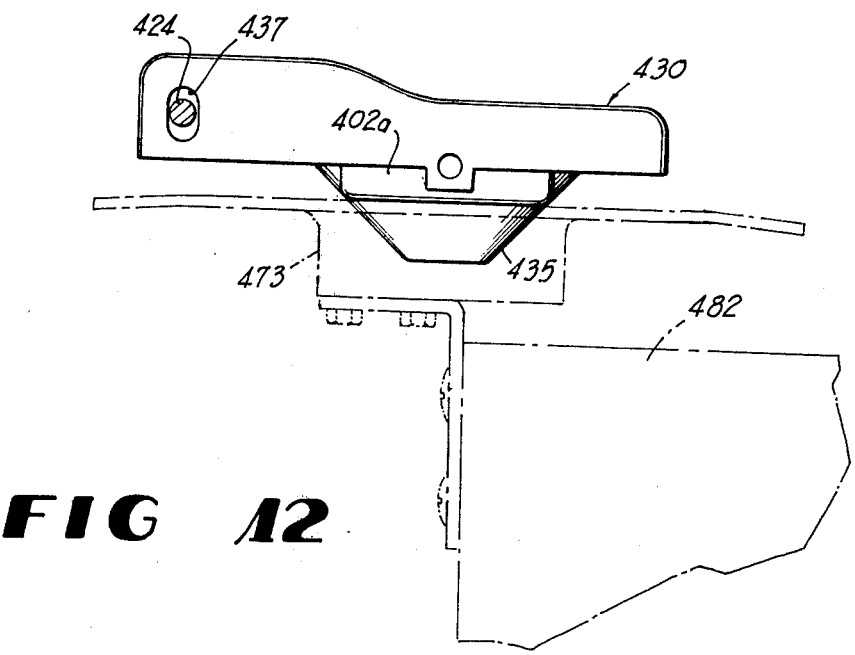
FIG. 12 is side elevational view of the cup shown in FIG. 10.

In the embodiment of FIG. 11 and 12, it will be seen that a pair of opposed runners 471 and 475 on the platform 473 of a weight cell 482 is adapted to receive a cup 430 for weighing. The skids 471 and 475 are disposed essentially parallel to each other and respectively receive longitudinally disposed downwardly protruding transversely spaced skids or runners 402a and 402b which protrude downwardly from the lower central block 404a and 404b of the cup 430. It will be understood that the skids 402a and 402b are disposed on opposite sides of the downwardly protruding portion of the cavity forming panel 435 of cup 430. The skids 402a and 402b are sufficiently long as to extend forwardly and rearwardly beyond the transverse axis of the center of gravity of the cup 230 and, hence, are sufficiently long that when received on the skids 471 and 475 will enable the cup to assume the position as seen in FIG. 12 in which the towbar 424 is intermediate the upper and lower ends of the slots, such as slot 437 in cup 430.

Figure 13:
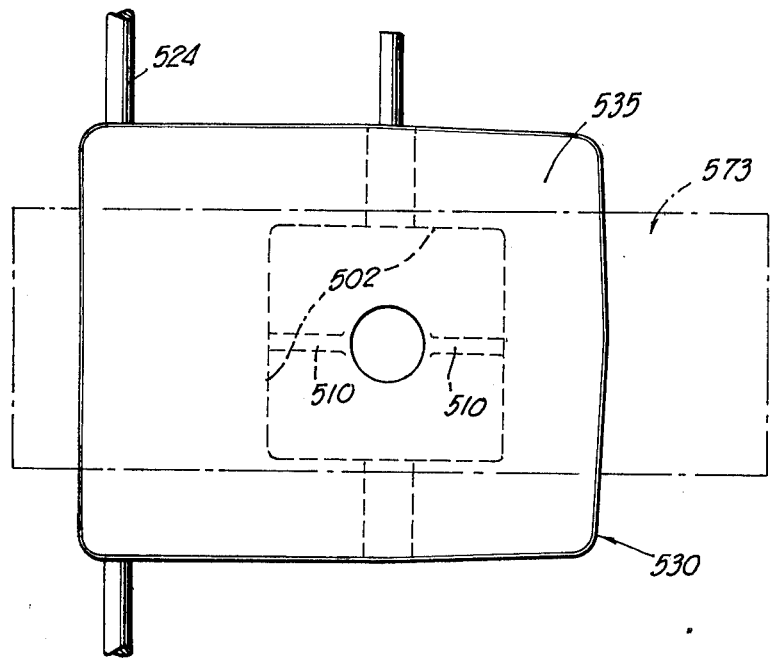
FIG. 13 is top plan view of a fifth embodiment of a fruit sizing cup suitable for use in the machine of FIG. 1.
Figure 14:
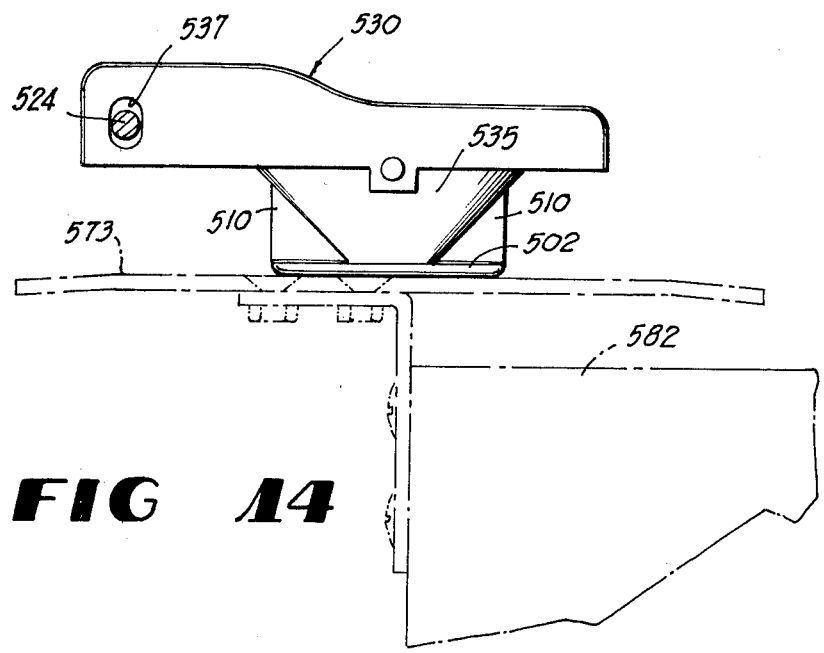
FIG. 14 is a side elevational view of the cup shown in in FIG. 13.

In FIGS. 13 and 14, still another form of cup is illustrated wherein there is a central flat bottom skid 502 formed at the lower central extremity of the panel 535 which forms the article receiving panel, the skid 502 thus being spaced below the lower edge portion 503 of the cup 530. The skid or slide plate 502 protrudes forwardly and rearwardly of the center of gravity of the cup 530 and is spaced parallel to and below the lower edge 503 of the cup 530 so that when it is received on a skid or flat weighing pan 573 of a weight cell 582, it will support the cup 530 in such a position that the tow bar 524 is between the upper and lower extremities of the elongated slot such as slot 537.

Forwardly and rearwardly extending fillets or reinforcing ribs 510 extend between the panel 535 and the upper surface of the slide plate 502, the fillets 510 being along the longitudinal center line as seen in FIG. 13.

It is thus seen that each embodiment foregoing has a tow bar 24 etc which has a vertical dimension substantially less than the vertical dimension of its slot 37 etc. and the upper extremity or portion, defining the slot, rests upon and is supported by the tow bar 24 etc. except when in the weigh zone B. The slot 37 etc., itself has a vertical dimension substantially greater than the vertical dimension of the cylindrical tow bar 24 etc. Thus, when the contour of the skids 71 and 75 lift the cup 30 etc. by portions forwardly and rearwardly of the center of gravity thereof, the tow bar 24 etc. no longer provides support.

Figure 15:
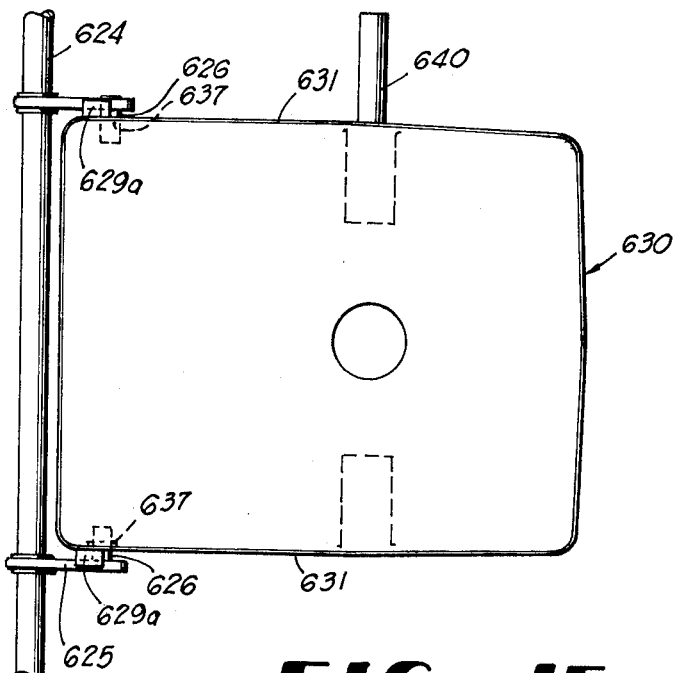
FIG. 15 is a top plan view of a sixth embodiment of the fruit sizing cup suitable for use in the machine of FIG. 1.
Figure 16:
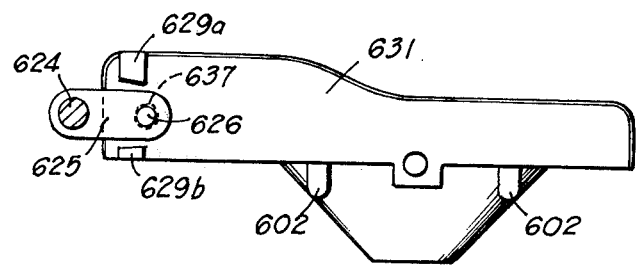
FIG. 16 is a side elevational view of the fruit sizing cup embodied in FIG. 14.
Figure 17:
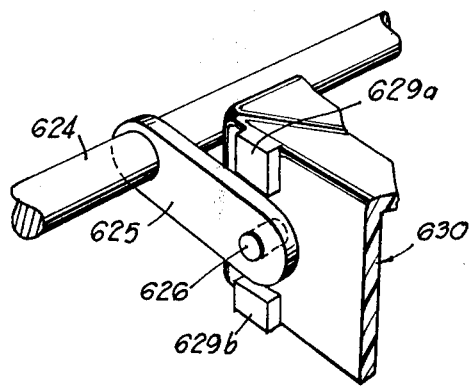
FIG. 17 is an enlarged fragmentary prospective view of a portion of the cup shown in FIG. 15.

In the embodiment of FIGS. 15, 16 and 17, an arrangement, which functions similarly to that of the preceeding embodiments, is depicted. Here, the tow bar 624 is provided with pivotally mounted, radially disposed, rearwardly extending links 625, the distal ends of which carry opposed transversely aligned, inwardly extending pivot pins 626, the axis of which is parallel to the axis of the tow bar 624. The pins protrude into transversely aligned holes 637 in a cup 630, the holes 637 journalling the pins 626.

Stops 629a and 629b above and below the hole 637 protrude outwardly from sides 631 of the cup 630 and limit the pivotal movement of links 625 about the axis of pins 626.

When the sidewise support pin 640 is supporting the cup 630, the links may engage the upper stops 629a and hence the tow bar 624 will provide additional support therefor; however, when the cup 630 is received by its ribs 602 on the skids of the scale, the contour of skids is such that the cup 630 will be lifted sufficiently to dispose the links between the stop 629a, 629b and enable the cup 630 to be essentially totally supported by the skids.

In all embodiments, it will be understood that the upper edges of the skids of the weight cell or scale are contoured to raise the forward portion of the associated cup 30 etc. Hence, for best results, the center of gravity of a cup 30 etc. and its article should be transversely inwardly of and between the skids 71, 75, etc.

It will be obvious to those skilled in the art that many variations may be made in the embodiments here chosen for the purpose of illustrating the present invention without departing from the scope thereof as defined by the appended claims.

I claim:

1. Apparatus for sorting articles according to the weight of each article, said apparatus being of the type having a continuous conveyor provided with spaced transverse successive tow bars for respectively towing cups, pivotally attached by their forward portions to said tow bars, through a load zone where the cups are respectively provided with articles therein and such loaded cups are thereafter towed through a weigh zone where the individual loaded cups are successively weighed by a weigh supporting surface of a weighing means and to subsequent successive discharge zones in which selected cups supported by support and release means are released in selected discharge zones by said support and release means so as to discharge said articles in the selected discharge zone according to the weight thereof detected in said weigh zone, the improvement comprising:

said cups each being provided with means for supporting that cup independently of its associated tow bar and solely on said weighing means while such cup, with its article, is weighed by said weighing means.

2. The apparatus defined in claim 1 wherein said tow bar extends through slot means in said cup and wherein said slot means is defined by an upper portion which rides on an upper portion of said towbar when sid towbar is in said load zone, said slot means being sufficient in its vertical dimension that, when said cap is supported in said weigh zone by said weighing surface, said cup is disposed at a height sufficient that, with respect to said cup, said upper portion of said tow bar is thereby spaced below said upper portion of said slot means.

3. The apparatus defined in claim 1 wherein said cup is provided with support means, forwardly and rearwardly of the center of gravity of said cup and its article, for engaging the weight supporting surface of said weighing means so that said cup is supported simultaneously, both forwardly and rearwardly of said center of gravity, by said surface.

4. The apparatus defined in claim 3 wherein said support means includes a pin extending sidewise in one direction from said cup and a pair of spaced pins extending sidewise in the other direction from the said cup and wherein said weighing surface includes a pair of opposed upstanding skids one of which receives and supports said pin and the other of which receives and simultaneously supports said pair of pins during the weighing of said cup.

5. The apparatus defined in claim 4 wherein said pin is spaced from said tow bar and provides support for said cup where said cup is in said load zone and is said discharge zones and wherein one of said release means of a particular discharge zone, in one portion of said zone release means, cooperates with said pin in enabling said cup to bypass said particular zone and, in another position of said one of said release means, will enable said pin to release the cup for discharging its article in said particular discharge zone.

6. The apparatus defined in claim 1 wherein said cups are of the type which includes sidewise extending pins, and wherein said support and release means includes rails for supporting said pins to cooperate with said tow bars in disposing said cups generally horizontally in said load zone and in portions of each of said discharge zones, bridge struts normally bridging the rails of said discharge zones, and means including a computer for selectively actuating said bridge struts to selectively remove them from their respective positions bridging said rails for releasing select pins of said cups so that said cups pivot about said tow bars from their generally horizontal positions to pendant positions for releasing their respective articles.

7. The apparatus defined in claim 1 wherein said cups each have side walls and said slot means includes transversely disposed slots in the front portion of said side walls, said slots being closed and having a vertical dimension substantially greater than the vertical dimension of said tow bar so that said tow bar is at an intermediate position in said slots when said cup is being weighed.

8. The apparatus defined in claim 1 wherein said cup includes a cavity and wherein said cup includes spaced downwardly extending transverse ribs forwardly and rearwardly of the center of said gravity of said cup and said weigh supporting surface includes a pair of spaced longitudinally extending skids on which said ribs are supported and moved during weighing of said cup and its article.

9. The apparatus defined in claim 1 wherein said cup includes a plurality of wheels protruding from the bottom portion of said cup, forwardly and rearwardly of the center of gravity of said cup and its article for riding on said weight supporting surface during weighing of the same.

10. The apparatus defined in claim 1 wherein said cup includes a central surface on the lower portion of said cup, said central portion being forwardly and rearwardly of the center of gravity of the cup and its article and being received on said weight support surface when said cup and its article is weighed.

11. Process of sorting articles of fruits or vegetables comprising the step of successively weighing the individual articles, separating the articles according to weight ranges so as to collect in prescribed zones articles of similar weight, totalizing the weight of each article in each zone and as the totalized weight approaches a predetermined weight, examining the weight of each successive article for an individual article having a specific weight to bring the total weight in said zone to just up to or just past the prescribed weight to thereby minimize the overweight.

12. The process defined in claim 11 wherein said articles to be weighed are fed in succession along a first prescribed path through a weighing zone where each article is successively weighed and the step of separating the articles includes passing them successively along a second prescribed path and diverting selected articles at different positions along the second path to the prescribed zones and wherein the step of adding an individual article includes bypassing heavier and lighter articles than the weight required to achieve the prescribed weight, from that zone until a selected weight article, which weighs enough to bring the weight of the articles in that zone just up to or just past the prescribed weight, is fed along the second path and diverting such selected weight article into that zone.

13. Apparatus defined in claim 1 including links pivotally connected to said tow bar and pivotally connected to said cup.

14. Process of sorting articles of fruits and vegetables comprising the steps of successively weighing the individual articles and storing each weigh in a memory, feeding the weighed articles along a prescribed path, diverting the articles according to prescribed weight ranges into a plurality of zones so that articles of similar weights are accumulated in the respective zones, totalizing in the memory the weight of the articles fed to each zone and, with respect to each zone, when the articles in that zone reach a set weight just below a prescribed weight for that zone, examining the weight of each article thereafter fed in the prescribed path for selecting a single article which weighs the difference or slightly more than the difference between the prescribed weight and the total weight of the articles for that zone, and feeding such selected article to that zone while entering the weight thereof to the total weight of articles for that zone and bypassing articles in said path which are within the weight range which would have been diverted to that zone.

* * * * *